United States Patent
Lim et al.

(10) Patent No.: US 11,237,621 B2
(45) Date of Patent: Feb. 1, 2022

(54) MULTI-TOUCH DISPLAY APPARATUS AND TOUCH RECOGNITION METHOD THEREOF

(71) Applicant: SK TELECOM CO., LTD., Seoul (KR)

(72) Inventors: Gukchan Lim, Seoul (KR); Jinsoo Jeon, Seoul (KR); Duckmoon Shin, Seoul (KR); Chanmin Yoon, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 439 days.

(21) Appl. No.: 16/328,516

(22) PCT Filed: Mar. 29, 2017

(86) PCT No.: PCT/KR2017/003425
§ 371 (c)(1),
(2) Date: Feb. 26, 2019

(87) PCT Pub. No.: WO2018/048050
PCT Pub. Date: Mar. 15, 2018

(65) Prior Publication Data
US 2021/0286459 A1 Sep. 16, 2021

(30) Foreign Application Priority Data
Sep. 12, 2016 (KR) .................. 10-2016-0117215

(51) Int. Cl.
*G06F 3/01* (2006.01)
*G06F 3/041* (2006.01)
*G06F 3/044* (2006.01)

(52) U.S. Cl.
CPC ............. *G06F 3/01* (2013.01); *G06F 3/044* (2013.01); *G06F 3/0412* (2013.01); *G06F 3/0414* (2013.01); *G06F 2203/04104* (2013.01)

(58) Field of Classification Search
CPC ............. G06F 3/0414; G06F 3/0412; G06F 2203/04104; G06F 3/041–3/04886
See application file for complete search history.

(56) References Cited

U.S. PATENT DOCUMENTS

| | | | |
|---|---|---|---|
| 2010/0127995 A1* | 5/2010 | Rigazio | G06F 3/04886 345/173 |
| 2012/0060127 A1 | 3/2012 | Ilmonen | |

(Continued)

FOREIGN PATENT DOCUMENTS

| | | |
|---|---|---|
| EP | 2 199 949 A1 | 6/2010 |
| KR | 10-2010-0081432 A | 7/2010 |

(Continued)

OTHER PUBLICATIONS

International Search Report dated Jul. 6, 2017, issued in corresponding International Application No. PCT/KR2017/003425.

*Primary Examiner* — Temesghen Ghebretinsae
*Assistant Examiner* — Ivelisse Martinez Quiles
(74) *Attorney, Agent, or Firm* — Hauptman Ham, LLP

(57) ABSTRACT

The present disclosure relates to a multi-touch display apparatus and a touch recognition method thereof. The method includes sensing a first touch made by at least two fingers of a user on a display panel, recognizing multiple touch positions of the first touch as an initial input, estimating a user's position based on the initial input, setting multiple touch regions on the display panel based on the user's position, and sensing a second touch on the display panel and setting coordinates of the second touch as temporary coordinates. The method further includes determining a touch region in which the temporary coordinates are (Continued)

positioned among the multiple touch regions, determining a correction direction and a correction amount for the temporary coordinates based on the determined touch region, and determining final coordinates of the second touch by applying the correction direction and the correction amount to the temporary coordinates.

10 Claims, 8 Drawing Sheets

(56) References Cited

U.S. PATENT DOCUMENTS

| | | | | |
|---|---|---|---|---|
| 2012/0154313 A1* | 6/2012 | Au | ............... | G06F 3/04883 |
| | | | | 345/173 |
| 2013/0127733 A1* | 5/2013 | Krishnaswamy | ... | G06F 3/04883 |
| | | | | 345/173 |
| 2013/0132903 A1* | 5/2013 | Krishnaswamy | ... | G06F 3/04883 |
| | | | | 715/825 |
| 2013/0207920 A1* | 8/2013 | McCann | ............ | G06F 3/04883 |
| | | | | 345/173 |

FOREIGN PATENT DOCUMENTS

| | | |
|---|---|---|
| KR | 10-1080512 B1 | 11/2011 |
| KR | 10-2012-0107884 A | 10/2012 |
| WO | 2012/064128 A2 | 5/2012 |

* cited by examiner

MULTI-TOUCH DISPLAY APPARATUS AND TOUCH RECOGNITION METHOD THEREOF

TECHNICAL FIELD

The present disclosure relates to a multi-touch display apparatus and a touch recognition method thereof; and, more particularly, to a multi-touch display apparatus for recognizing user's touch positions by correcting the coordinates of the user's touch positions on the multi-touch display apparatus and a touch recognition method thereof.

BACKGROUND

As is well known in the art, a display apparatus such as a smartphone or the like employs a display unit in which a touch screen and a display panel are integrated. In such a display apparatus, when touched by a user, the coordinates mechanically sensed on the display panel may differ from the user's desired coordinates to be inputted. This is because a difference may exist between the user's desired coordinates to be inputted and the coordinates sensed on the touch screen due to the direction of a user's gaze or the degree of bending of a user's finger, and the difference may change depending on the circumstances.

Therefore, in the conventional case, user's touch positions are recognized by calculating a user's finger-touch area on a display panel to estimate a user's finger-usage pattern (e.g., whether the finger is straightened or the finger is laid down to touch the display panel) and correcting the touch positions of the user's touch based on the estimation result (see, e.g., Korean Patent Publication No. 10-1080512).

Recently, a tabletop display apparatus having a multi-touch supporting display panel on the top of a table of the tabletop display apparatus has been widely used. Such a tabletop display apparatus has been scaled-up such that a plurality of users can easily interact with each other during cooperative work.

However, since such a tabletop display apparatus has a large-sized flat display panel, the difference between the user's touching coordinates mechanically sensed on the display panel and the user's desired coordinates to be inputted becomes greater compared to that of a small display apparatus such as a smartphone or the like. Therefore, it is required to reduce such a difference.

SUMMARY

In view of the above, the present disclosure provides a multi-touch display apparatus that recognizes a user's touch position on a display panel by correcting coordinates of the user's touch position by using a correction direction and a correction amount determined based on the user's position, and a touch recognition method thereof.

It is to be understood, however, that the object of the present disclosure is not limited to those mentioned above. Other objects not mentioned above will be clearly understood by those skilled in the art from the following description.

In accordance with an aspect of the present disclosure, there is provided a touch recognition method performed in a multi-touch display apparatus, the touch recognition method including: sensing a first touch made by at least two fingers of a user on a display panel; recognizing a plurality of touch positions of the first touch as an initial input; estimating a user's position based on the initial input; setting a plurality of touch regions on the display panel based on the user's position; sensing a second touch on the display panel and setting coordinates of the second touch as temporary coordinates; determining a touch region in which the temporary coordinates are positioned among the plurality of touch regions; based on the determined touch region, determining a correction direction and a correction amount for the temporary coordinates; and determining final coordinates of the second touch by applying the correction direction and the correction amount to the temporary coordinates.

In accordance with another aspect of the present disclosure, there is provided a multi-touch display apparatus including: a display unit including a display panel and an input interface configured to recognize a user's touch input on the display panel and a control unit configured to determine a touch position corresponding to the user's touch input. Further, the control unit is configured to sense a first touch made by at least two fingers of a user on a display panel through the input interface, recognize a plurality of touch positions of the first touch as an initial input, estimate a user's position based on the initial input, set a plurality of touch regions on the display panel based on the user's position, sense a second touch on the display panel through the input interface and set coordinates of the second touch as temporary coordinates, determine a touch region in which the temporary coordinates are positioned among the plurality of touch regions, based on the determined touch region, determine a correction direction and a correction amount for the temporary coordinates, and determine final coordinates of the second touch by applying the correction direction and the correction amount to the temporary coordinates.

In accordance with the embodiment of the present disclosure, the user's touch positions on the display panel can be recognized by correcting coordinates of the user's touch positions by using the correction direction and the correction amount determined based on the user's position.

Therefore, it becomes possible to minimize the difference between the user's touching coordinates mechanically sensed on the display panel and the user's desired coordinates to be inputted.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of the functions of the embodiments of the present disclosure and may vary depending on a user's or an operator's intention or practice. Accordingly, the definition thereof may be made on a basis of the content throughout the specification.

Figure 1:
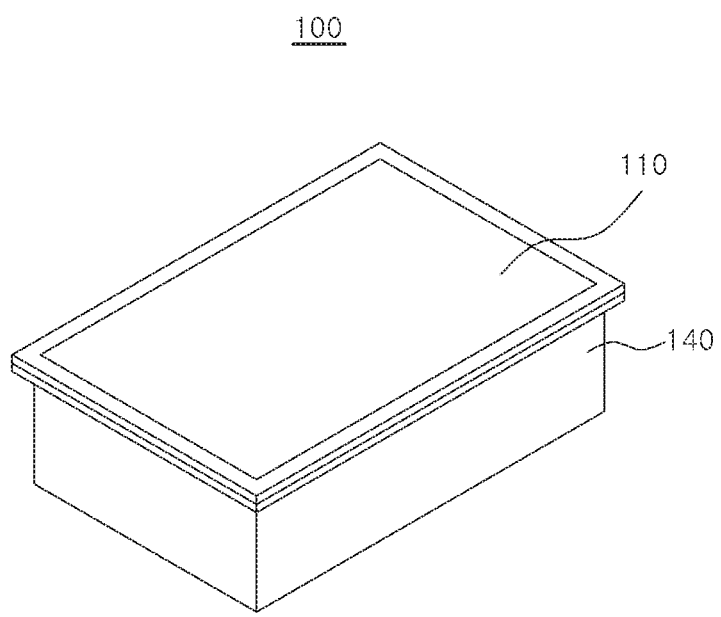
FIG. 1 is an external view of a multi-touch display apparatus according to an embodiment of the present disclosure.
Figure 2:
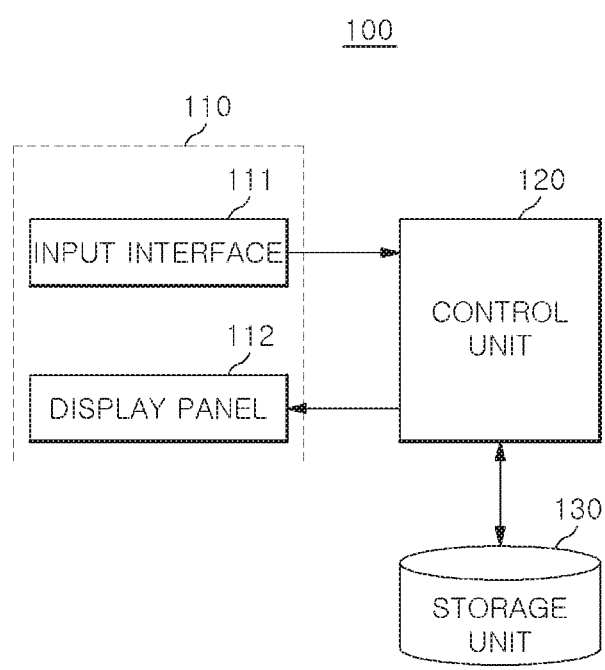
FIG. 2 is a block diagram of the multi-touch display apparatus according to the embodiment of the present disclosure.
Figure 3:
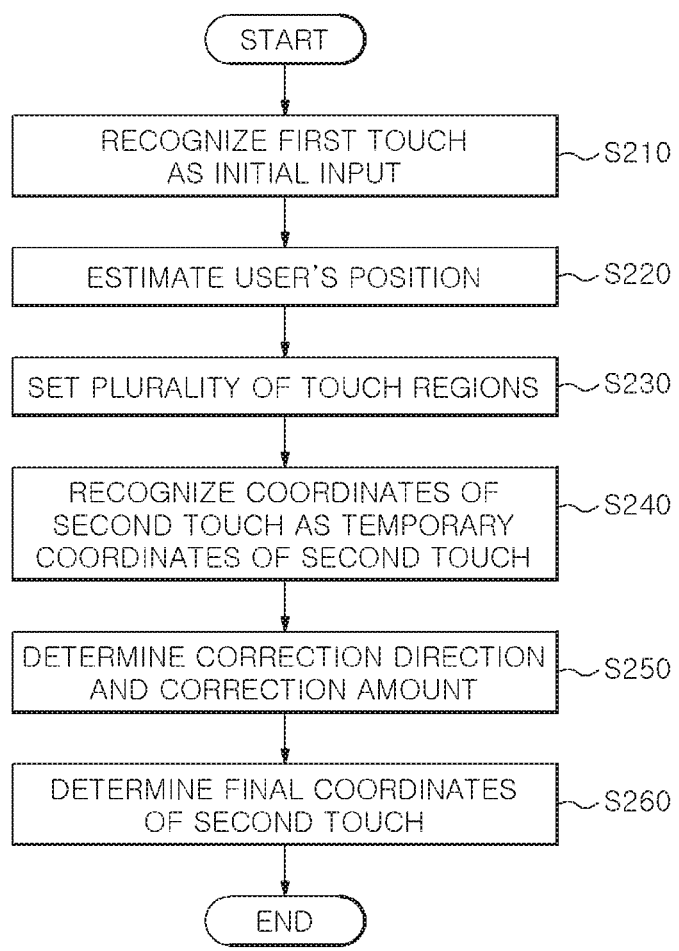
FIG. 3 is a flowchart for explaining a touch recognition method performed in the multi-touch display apparatus according to the embodiment of the present disclosure.

FIG. 1 is an external view of a multi-touch display apparatus according to an embodiment of the present disclosure. FIG. 2 is a block diagram of the multi-touch display apparatus according to the embodiment of the present disclosure.

A multi-touch display apparatus 100 according to the embodiment of the present disclosure may be a tabletop multi-touch display apparatus. The multi-touch display apparatus 100 includes a display unit 110, a control unit 120, a storage unit 130, and a table unit 140. The display unit 110 includes an input interface 111 and a display panel 112.

The display unit 110 includes the display panel 112 on which an image is displayed based on a control signal of the control unit 120. For example, the display panel 112 can be implemented by a display device such as a liquid crystal display (LCD) panel, a light emitting diode (LED) panel, or the like.

The display unit 110 further includes the input interface 111 through which a user's touch input on the display panel 112 is recognized. For example, the input interface 111 may be implemented by a capacitive touch screen that detects a signal generation position by detecting changes in the capacitance of the touch screen panel. Alternatively, the input interface 111 may be implemented by infrared ray transmission/reception modules arranged at predetermined intervals along the periphery of the display panel 112 to transmit/receive infrared rays and detect the touch position of a user when the transmission/reception of the infrared rays is blocked due to a user's touch input.

The control unit 120 is configured to recognize the coordinates of the touch position corresponding to the user's touch on the display panel 112 based on the detection signal from the input interface 111. For example, the control unit 120 may be implemented by a processor such as a central processing unit (CPU) or the like.

The control unit 120 is further configured to sense a first touch made by at least two fingers of a user's right hand or a user's left hand on the display panel 112 and recognize the coordinates of multiple touch positions of the first touch as an initial input. For example, the control unit 120 recognizes a touch using five fingers of the right hand or a touch using five fingers of the left hand as the initial input.

Then, the control unit 120 is further configured to estimate a user's position based on the initial input. The control unit 120 determines whether the initial input is made by the right hand or the left hand based on the relative positions of the position touched by the thumb and the positions touched by the other fingers on the coordinates of the touch positions. If it is determined that the touch is made by the left hand, the user is estimated to be positioned on the right side of the touch position. If it is determined that the touch is made by the right hand, the user is estimated to be positioned on the left side of the touch position.

Further, the control unit 120 is configured to estimate a distance between the wrist and each of the touch positions based on a touch area of each touch position of the first touch, a touch shape in each touch position of the first touch or an interval between adjacent touch positions of the first touch. The control unit 120 is further configured to estimate a separation distance between the user and the display panel 112 based on the estimated distance between the wrist and each of the touch positions of the first touch. Based on the above, a horizontal distance between the wrist and each of the touch positions can be estimated. The horizontal distance indicates a linear distance between the wrist and each touch position on the same horizontal plane (e.g., the display panel 112). For example, a portion of the touch shape in each touch position that has a smaller width is determined as a tail portion. The horizontal distance between the wrist and each touch position is estimated to become longer as the tail portion becomes longer and the separation distance between the user and the display panel 112 becomes shorter as the horizontal distance becomes longer. Alternatively, it is possible to estimate that the horizontal distance between the wrist and each touch position is shorter as the interval between the adjacent touch positions becomes greater. Alternatively, it is possible to estimate that the horizontal distance between the wrist and each touch position becomes shorter as the touch area of each touch position becomes greater.

Further, the control unit 120 is configured to set a plurality of touch regions on the display panel 112 based on the user's position. For example, the control unit 120 may set a first position of the display panel 112 that corresponds to the user's position and set a plurality of concentric virtual circles having different diameters about the first position. The control unit 120 sets a plurality of touch regions provided between the concentric virtual circles as a first touch region. Here, a single point on the periphery of the display panel 112 that faces the user can be set as the first position.

Alternatively, the control unit 120 may set a plurality of concentric virtual circles having different diameters about a second position of the display panel 112 that corresponds to a position of the left hand of the user and set a plurality of touch regions provided between the concentric virtual circles as a second touch region. Moreover, the control unit 120 may set a plurality of concentric virtual circles having different diameters about a third position of the display panel 112 that corresponds to a position of the right hand of the user and set a plurality of touch regions provided between the concentric virtual circles as a third touch region. Here, a single point on the periphery of the display panel 112 that faces the position of the left hand can be set as the second position, and a single point on the periphery of the display panel 112 that faces the position of the right hand can be set as the third position.

Further, the control unit 120 is configured to sense a user's second touch on the display panel 112 and recognize coordinates of the second touch as temporary coordinates of the second touch. For example, the second touch may be a single touch using one finger.

Then, the control unit 120 determines a touch region in which the temporary coordinates are positioned among the plurality of touch regions set on the display panel 112 and determines a correction direction and a correction amount for the temporary coordinates based on the determination result. For example, the farther away the temporary coordinates are positioned in the first touch region from the first position, the greater the amount of correction that may be determined by the control unit 120. If the temporary coordinates are positioned in the second touch region, the farther away the temporary coordinates are positioned in the second touch region from the second position, the greater the amount of correction that may be determined by the control unit 120. If the temporary coordinates are positioned in the third touch region, the farther away the temporary coordinates are positioned in the third touch region from the third position, the greater the amount of correction that may be determined by the control unit 120.

Further, the control unit 120 is configured to determine the final coordinates of the second touch by applying the determined correction direction and the determined correction amount to the temporary coordinates.

Various application programs and operation programs for driving the multi-touch display apparatus 100 are stored in the storage unit 130. For example, the storage unit 130 may be implemented by a memory device such as an Electrically Erasable Programmable Read-Only Memory (EEPROM) or the like.

Hereinafter, a touch recognition method performed in the multi-touch display apparatus 100 according to the embodiment of the present disclosure will be described in detail with reference to FIGS. 1 to 9.

Figure 4:
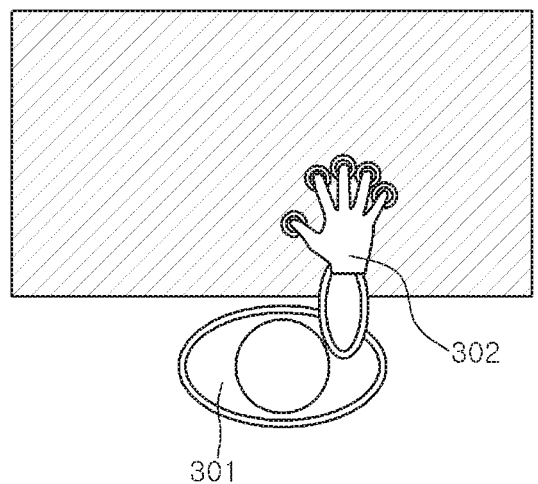
FIG. 4 shows an example of a touch input executed by a user in the multi-touch display apparatus according to the embodiment of the present disclosure.

First, the multi-touch display apparatus 100 may be set to sense, as an initial input, a touch input made by at least two fingers of a user's right hand or a user's left hand on the display panel 112. For example, when a start menu is initially called or user authentication is performed, five points on the display panel 112 can be touched by five fingers of the right hand or the left hand, and such a five-point touch can be set as the initial input. As shown in FIG. 4, it is assumed in this embodiment that a user 301 touches five points on the display panel 112 with five fingers of a right hand 302.

Then, the input interface 111 senses the five-point touch and transmits the detection signal to the control unit 120. The control unit 120 recognizes the touch position coordinates corresponding to the five-point touch on the display panel 112 based on the detection signal from the input interface 111. In other words, the control unit 120 senses a first touch made by at least two fingers of the user's right hand or a user's left hand on the display panel 112 and recognizes coordinates of a plurality of touch positions corresponding to the first touch as an initial input (step S210).

Then, the control unit 120 estimates a user's position based on the initial input. Here, the control unit 120 can distinguish whether the touch was made by the right hand or the left hand based on the relative positions of the position touched by the thumb and the positions touched by the other fingers on the touch position coordinates.

For example, the control unit 120 determines a touch position among the plurality of touch positions as a position touched by a thumb when the touch position has a relatively large touch area or an area greater than a preset area. Further, when the touch position of the thumb is placed on the right side of the touch positions of the other fingers, the control unit 120 determines that the touch is made by the left hand. When the touch position of the thumb is placed on the left side of the touch positions of the other fingers, the control unit 120 determines that the touch is made by the right hand. Further, when it is determined that the touch is made by the left hand, it is estimated that the user is positioned on the right side of the touch positions. When it is determined that the touch is made by the right hand, it is estimated that the user is positioned on the left side of the touch positions. The control unit 120 further estimates a user's position by determining the portion of a touch shape in each touch position that has a smaller width (or a portion having a smaller touch area) as the tail portion and estimating that the user is positioned in a direction to which the tail portion is directed.

Next, the control unit 120 estimates a horizontal distance between the wrist and each of the touch positions of the first touch based on the touch area of each touch position of the first touch, the touch shape in each touch position of the first touch or the interval between adjacent touch positions of the first touch in step S210, and then estimates the separation distance between the user and the display panel 112 based on the horizontal distance.

Figure 8:
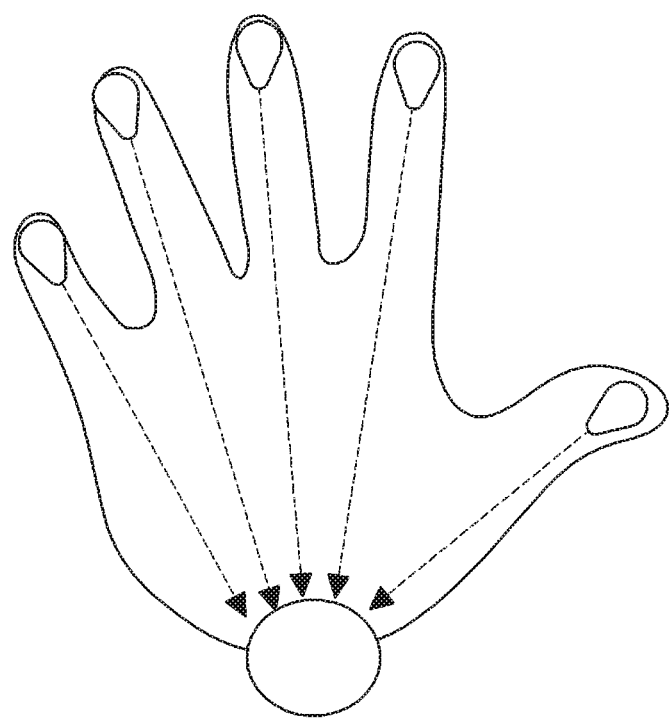
FIG. 8 shows positions of a wrist and fingers at the time of touching a display panel by a user in the multi-touch display apparatus according to the embodiment of the present disclosure.
Figure 9A:
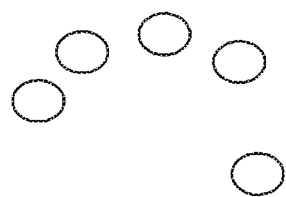
FIGS. 9A to 9C show changes in a touch shape due to changes in a separation distance between a user and the display panel in the multi-touch display apparatus according to the embodiment of the present disclosure.
Figure 9B:
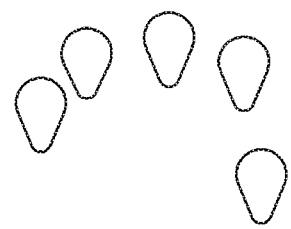
Figure 9C:
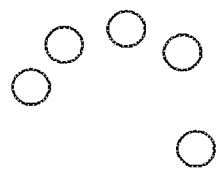

FIG. 8 shows the positions of the wrist and the fingers at the time of touching the display panel 112 by the user in the multi-touch display apparatus according to the embodiment of the present disclosure. FIGS. 9A to 9C show changes in the touch shape due to the changes in the separation distance between the user and the display panel in the multi-touch display apparatus according to the embodiment of the present disclosure. FIG. 9A shows a case in which the user and the display panel 112 are close to each other. FIG. 9B shows a case in which the user and the display panel 112 are far from each other. FIG. 9C shows a case in which the user and the display panel 112 are at a very close distance to each other.

For example, the control unit 120 may determine the portion of the touch shape in each touch position that has a smaller width as the tail portion and estimate that the horizontal distance between the wrist and each touch position becomes longer as the tail portion becomes longer. The control unit 120 may estimate that the horizontal distance between the wrist and each touch position becomes shorter as the interval between the adjacent touch positions becomes greater or as the touch area of each touch position becomes greater.

Further, the control unit 120 estimates that the separation distance between the user and the display panel 112 becomes shorter as the horizontal distance between the wrist and each of the touch positions becomes longer. In this connection, the control unit 120 may set a plurality of reference ranges for the length of the tail portion, the touch area or the touch interval and store in advance a mapping table containing a relationship between the reference ranges and the horizontal distance/separation distance in the storage unit 130. Further, the control unit 120 may first estimate at least one of the length of the tail portion, the touch area and the touch interval, and then estimate the separation distance between the user and the display panel 112 based on the mapping table. For example, the control unit 120 estimates that the separation distance between the user and the display panel 112 becomes longer as the touch area becomes greater. When a user who is relatively close to the display panel 112 touches the display panel 112 with a finger, the finger may typically be straightened to touch the display panel 112 with the fingertip, and when a user who is relatively far from the display panel 112 touches the panel 112 with a finger, the finger may typically be laid down to touch the display panel 112 with a fingerprint portion. That is to say, the touch area that the finger comes into contact with on the display panel 112 is relatively greater when the finger is laid down to touch the display panel 112 than when the finger is straightened to touch the display panel 112.

Figure 5A:
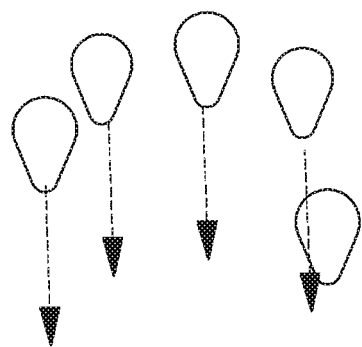
FIGS. 5A and 5B show examples of a touch shape measured in the multi-touch display apparatus according to the embodiment of the present disclosure.
Figure 5B:
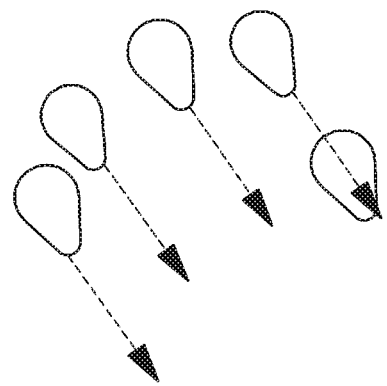

The control unit 120 estimates the direction in which the user is located based on the touch shape of each touch position of the first touch in step S210. When the touch shape has a tail portion as shown in FIGS. 5A and 5B, it can be estimated that the user is positioned in the vertical direction in FIG. 5A and that the user is positioned in the diagonal direction in FIG. 5B.

In the above manner, after the control unit 120 recognizes the first touch as the initial input in step S210, the control unit 120 can comprehensively estimate the user's position based on the initial input (step S220).

Next, the control unit 120 sets a plurality of touch regions on the display panel 112 based on the user's position estimated in step S220. Different correction amounts are applied depending on the respective touch regions when recognizing the final coordinates of the touch positions in step S260 to be described later. In other words, the weights of the correction amounts applied to the plurality of touch regions are different from each other.

Figure 6:
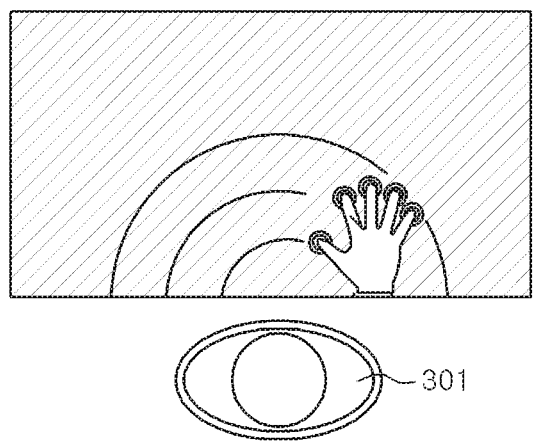
FIGS. 6 and 7 show examples of touch regions set in the multi-touch display apparatus according to the embodiment of the present disclosure.

For example, as shown in FIG. 6, the control unit 120 may set a plurality of concentric virtual circles having different diameters about a first position on the display panel that corresponds to a position of the user 301 and set a plurality of touch regions provided between the concentric virtual circles as a first touch region.

Figure 7:
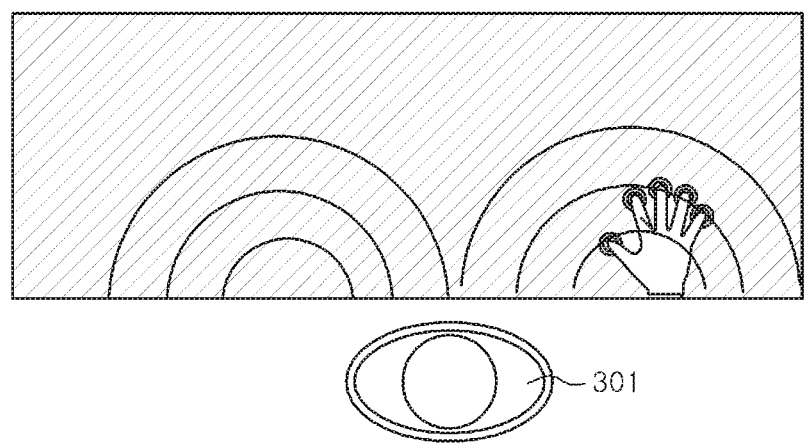

Alternatively, as shown in FIG. 7, the control unit 120 may set a plurality of concentric virtual circles having different diameters about a second position on the display panel that corresponds to a position of the left hand of the user 301 and set a plurality of touch regions provided between the concentric virtual circles as a second touch region. Further, the control unit 120 may set a plurality of concentric virtual circles having different diameters about a third position on the display panel that corresponds to a position of the right hand of the user 301 and set a plurality of touch regions provided between the concentric virtual circles as a third touch region (step S230).

Then, the user 301 of the multi-touch display apparatus 100 performs a touch input on the display panel 112 to input specific information or desired information. The control unit 120 senses this touch input as a second touch mechanically sensed on the display panel 112 when the user inputs the specific information or the desired information on the display panel 112 and recognizes coordinates of the second touch as temporary coordinates of the second touch. For example, the second touch may be a single touch using one finger to be distinguished from the first touch in step S210. Here, recognizing and setting the coordinates of the second touch as the temporary coordinates of the second touch is to correct the coordinates when the user's touching coordinates mechanically sensed on the display panel 112 are different from the user's desired coordinates to be inputted (step S240).

Thereafter, the control unit 120 determines a touch region where the temporary coordinates inputted in step S240 are positioned among the plurality of touch regions set on the display panel 112 in step S230. Based on the determination result, the control unit 120 determines a correction direction and a correction amount of the temporary coordinates. For example, in the case shown in FIG. 6, the correction amount may be determined to be greater as the touch region where the temporary coordinates are positioned among the plurality of touch regions becomes farther from the first position corresponding to the position of the user 301. In the case shown in FIG. 7, the correction amount may be determined to be greater as the touch region where the temporary coordinates are positioned among the plurality of touch regions becomes farther from the second position corresponding to the position of the left hand of the user 301 and as the touch region where the temporary coordinates are positioned among the plurality of touch regions becomes farther from the third position corresponding to the position of the right hand of the user 301. The correction direction may be determined to be opposite the direction that was estimated as the user's position in step S220. For example, when the touch shape has a tail portion as shown in FIGS. 5A and 5B, the correction direction may be determined to be the opposite direction to which the tail portion is directed (i.e., a direction toward a head portion) (step S250).

Next, the control unit 120 corrects the temporary coordinates of the second touch recognized in step S240 by the correction amount and the correction direction determined in step S250 and determines the final coordinates of the second touch.

Here, the correction amount, determined and applied to the coordinates of the touch position by the control unit 120, indicates the difference between the user's touching coordinates mechanically sensed on the display panel 112 and the user's desired coordinates to be inputted. If the difference is the same as the correction amount determined in step S250, it can be considered that the error between the user's touching coordinates mechanically sensed on the display panel 112 and the user's desired coordinates to be inputted has been completely removed (step S260).

As described above, in accordance with the embodiment of the present disclosure, the user's touch position on the display panel is corrected and recognized based on the correction direction and the correction amount determined based on the user's position.

Therefore, it is possible to minimize the difference between the user's touching coordinates mechanically sensed on the display panel and the user's desired coordinates to be inputted.

The combinations of the respective sequences of a flow diagram attached herein may be carried out by computer program instructions. Since the computer program instructions may be executed by the processor of a general purpose computer, a special purpose computer, or other programmable data processing apparatus, the instructions, executed by the processor of the computer or other programmable data processing apparatus, create means for performing functions described in the respective sequences of the sequence diagram. The computer program instructions, in order to implement functions in a specific manner, may be stored in a computer-readable storage medium or a computer-useable storage medium for other programmable data processing apparatus, and the instructions stored in the computer-readable storage medium or the computer-useable storage medium may produce manufacturing items that include means for instructions to perform the functions described in the respective sequences of the sequence diagram. The computer program instructions may be loaded in a computer or other programmable data processing apparatus, and therefore, the instructions, which are a series of sequences executed in a computer or other programmable data processing apparatus to create processes executed by a computer to operate a computer or other programmable data processing apparatus, may provide operations for executing functions described in the respective sequences of the flow diagram.

Moreover, the respective sequences may refer to two or more modules, segments, or codes including at least one executable instruction for executing a specific logic function(s). In some alternative embodiments, it is noted that the functions described in the sequences may be run out of order. For example, two consecutive sequences may be executed simultaneously or in reverse order according to the particular function.

The above description illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

The embodiments of the present disclosure can be utilized in a technical field for recognizing a user's touch position in a tabletop display device including a display panel for a large-sized tabletop interface.

What is claimed is:

1. A touch recognition method performed in a multi-touch display apparatus, the touch recognition method comprising:
 sensing a first touch made by at least two fingers of a user on a display panel;
 recognizing a plurality of touch positions of the first touch as an initial input;
 estimating a user's position based on the initial input;
 setting a plurality of touch regions on the display panel based on the user's position;
 sensing a second touch on the display panel and setting coordinates of the second touch as temporary coordinates;
 determining a touch region in which the temporary coordinates are positioned among the plurality of touch regions;
 based on the determined touch region, determining a correction direction and a correction amount for the temporary coordinates; and
 determining final coordinates of the second touch by applying the correction direction and the correction amount to the temporary coordinates.

2. The touch recognition method of claim 1, wherein said estimating the user's position includes:
 estimating a horizontal distance between a wrist and each of the plurality of touch positions based on a touch area of each of the plurality of touch positions, a touch shape in each of the plurality of touch positions or an interval between adjacent touch positions of the first touch, and estimating a separation distance between the user and the display panel based on the horizontal distance.

3. The touch recognition method of claim 1, wherein said estimating the user's position includes:
 determining a tail portion of a touch shape in each of the plurality of touch positions of the first touch and estimating that the user is located in a direction to which the tail portion is directed.

4. The touch recognition method of claim 1, wherein said setting the plurality of touch regions includes:
 setting a plurality of touch regions as a first touch region about a first position of the display panel that corresponds to the user's position,
 wherein the correction amount is determined to be greater as a distance between a touch region of the first touch region where the temporary coordinates are positioned and the first position becomes longer.

5. The touch recognition method of claim 1, wherein said setting the plurality of touch regions includes:
 setting a plurality of touch regions as a second touch region about a second position of the display panel that corresponds to a position of a left hand of the user, and
 setting a plurality of touch regions as a third touch region about a third position of the display panel that corresponds to a position of a right hand of the user,
 wherein when the temporary coordinates are positioned in the second touch region, the correction amount is determined to be greater as a distance between a touch region of the second touch region where the temporary coordinates are positioned and the second position becomes longer, and
 when the temporary coordinates are positioned in the third touch region, the correction amount is determined to be greater as a distance between a touch region of the third touch region where the temporary coordinates are positioned and the third position becomes longer.

6. A multi-touch display apparatus comprising:
 a display unit including a display panel and an input interface configured to recognize a user's touch input on the display panel; and
 a control unit configured to determine a touch position corresponding to the user's touch input,
 wherein the control unit is configured to:
 sense a first touch made by at least two fingers of a user on the display panel through the input interface,
 recognize a plurality of touch positions of the first touch as an initial input,
 estimate a user's position based on the initial input,
 set a plurality of touch regions on the display panel based on the user's position,
 sense a second touch on the display panel through the input interface and set coordinates of the second touch as temporary coordinates,
 determine a touch region in which the temporary coordinates are positioned among the plurality of touch regions,
 based on the determined touch region, determine a correction direction and a correction amount for the temporary coordinates, and
 determine final coordinates of the second touch by applying the correction direction and the correction amount to the temporary coordinates.

7. The multi-touch display apparatus of claim 6, wherein the control unit estimates the user's position by estimating a horizontal distance between a wrist and each of the plurality of touch positions based on a touch area of each of the plurality of touch positions, a touch shape in each of the plurality of touch positions or an interval between adjacent touch positions of the first touch, and estimating a separation distance between the user and the display panel based on the horizontal distance.

8. The multi-touch display apparatus of claim 6, wherein the control unit estimates the user's position by determining a tail portion of a touch shape in each of the plurality of touch positions of the first touch and estimating that the user is positioned in a direction to which the tail portion is directed.

9. The multi-touch display apparatus of claim 6, wherein the control unit sets the plurality of touch regions by setting a plurality of touch regions as a first touch region about a first position of the display panel that corresponds to the user's position, wherein the correction amount is determined to be greater as a distance between a touch region of the first touch region where the temporary coordinates are positioned and the first position becomes longer.

10. The multi-touch display apparatus of claim 6, wherein the control unit sets the plurality of touch regions by setting a plurality of touch regions as a second touch region about a second position of the display panel that corresponds to a position of a left hand of the user, and setting a plurality of touch regions as a third touch region about a third position of the display panel that corresponds to a position of a right hand of the user, wherein when the temporary coordinates are positioned in the second touch region, the correction amount is determined to be greater as a distance between a touch region of the second touch region where the temporary coordinates are positioned and the second position becomes longer, and when the temporary coordinates are positioned in the third touch region, the correction amount is determined to be greater as a distance between a touch region of the third touch region where the temporary coordinates are positioned and the third position becomes longer.

* * * * *